July 24, 1934.  L. VON REIS  1,967,761
LEER
Filed Dec. 17, 1930
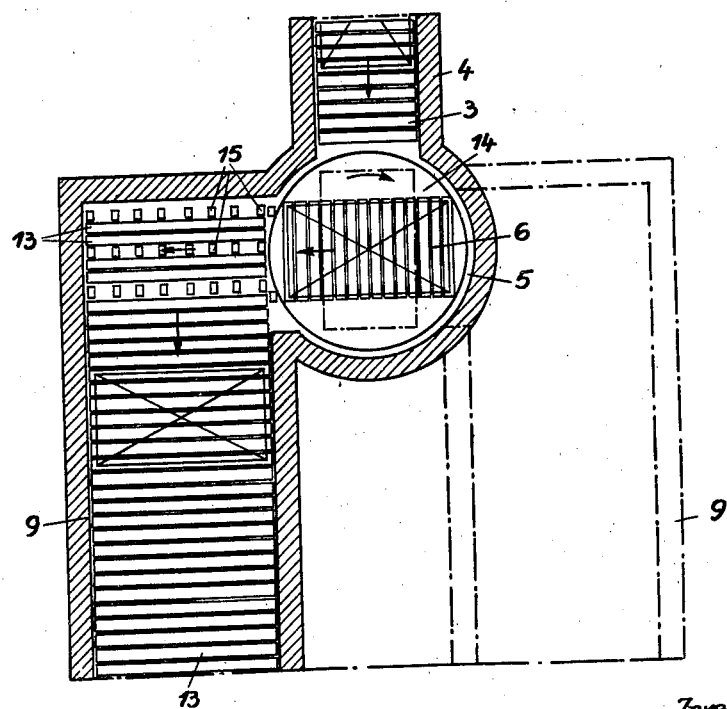
Inventor:
Lambert von Reis
per
Dorsey Cole
Attorney.

Patented July 24, 1934

1,967,761

UNITED STATES PATENT OFFICE 1,967,761

LEER

Lambert von Reis, Herzogenrath, Germany, assignor to N. V. Maatschappij tot Beheer en Exploitatie van Octrooien, The Hague, Netherlands Application December 17, 1930, Serial No. 503,034
In Germany December 21, 1929

3 Claims. (Cl. 49—3)

This invention relates to the annealing of glass sheets and essentially resides in providing a leer which comprises a sheet feeding path formed by a roller bed and at the delivery end of the latter a distributing chamber in which there is a turn-table adapted to receive the glass sheets from the forming means and feeding rollers and to turn them in relation to the axis of the feeding rollers so that they are delivered to the leer or leers and fed therethrough in the direction of their width.

The invention renders it possible to accommodate the leer structure as a whole to the conditions of available space of the glass works, since the sheets can be delivered at will into leering channels having conveying bars or conveying rollers and extending in or parallelly of the working direction of the forming machine or at any desired angle thereto. It is, moreover, possible to alternately introduce the sheets which are successively produced at a high speed—rolling speed—into different leering channels the conveying means of which operate at a low speed—annealing speed—so that no difficulties and losses of time are incurred in the stowing of the sheets. A particular advantage of the invention resides in that the sheets being fed in the direction of their length can be introduced into and conveyed through the leering channels in the direction of their width, whereby these channels can be made much shorter than channels through which the sheets must travel in the direction of their length. While it is in itself known to carry glass sheets in the direction of their width through leers with conveying bars, it is entirely novel to provide a device which also allows of conveying such sheets in the direction of their width through roller leers. The invention also proposes for the first time to feed glass sheets exclusively on roller beds to leers with conveying bars, this having hitherto been performed either by means of transporting tables and stowing devices or by means of roller beds combined with stowing devices.

In order to allow the invention to be more clearly understood, it will now be described with reference to the accompanying drawing which is a diagrammatic plan view of an arrangement according to the invention.

As shown in the figure, a feeding channel 4, having rollers 3, extends from a sheet forming machine (not shown) into a distributing chamber 5 enclosing a turn-table 14. Rollers 3 are adapted to be rotated in opposite directions in order to give the sheet a reciprocating movement until it has acquired the necessary rigidity. This device is well-known in the art. The reciprocatory movement may, for instance, be carried out by the so-called step of the pilgrim method, which means that the sheet is always moved ahead a predetermined distance and then moved back a shorter distance.

Turn-table 14 carries a set of fixedly mounted rollers 6. The table can be adjusted so that the rollers 6 form a continuation of the roller bed 3 or assume a position at any desired angle to the roller bed 3, the figure showing the rollers 3 and 6 at an angle of 90 degrees. As shown, the conveying means 13 of the leer 9 consist of rollers and the leer is connected to the chamber 5 at one side thereof so as to extend parallelly of the feeding channel 4. The rollers 6 are on the same level as the rollers 3. The top surface of the rollers 13 of the channel 9 is somewhat lower than the surface of the rollers 6. Arranged in the first part of the leer 9 between the rollers 13 are rollers 15 the axes of which cross those of the rollers 13. The rollers 15 are mounted so that they can be raised in unison onto the level of the rollers 6 and lowered below the level of the rollers 13.

When with this device a glass sheet has been delivered from the rollers 3 of the channel 4 onto the rollers 6 of the turn-table 14, the latter is turned from the dotted position by 90 degrees into the full-line position and the rollers 15 are raised into the plane of the rollers 6. Proper rotation of the rollers 6 and 15 will cause the sheet to be introduced into the leer 9 where by lowering the rollers 15 it is deposited on the rollers 13 so that same can carry the sheet in the direction of its width, i. e. with one of its long sides ahead, through the leer.

More than one leering channel may be connected to the distributing chamber 5, as indicated by dot-and-dash lines. The leers 9 may also be arranged so as to extend from the chamber 5 closely beside the feeding channel 4, that is to say in a direction towards the entrance end of the latter.

The means for mounting and driving the various conveying rollers or bars, for raising and lowering the rollers and for operating the turn-table may be of any approved construction well-known in the art, and therefore are not shown in the drawing.

Having thus described my invention, what I claim as new and desire to secure by Letters Patent is:—

1. In combination with means for producing a glass sheet, apparatus for annealing the sheet which comprises a roller conveyor for carrying the sheet in the direction of its length from the said producing means, a chamber in which the conveyor terminates, a turn-table in the chamber whereby the sheet is turned on its axis of movement, an annealing leer extending parallelly of the said conveyor, means for transferring the sheet from the turn-table to the leer, and rollers in the leer whereby the sheet is carried through the leer in the direction of its width.

2. In combination with means for producing a glass sheet, apparatus for annealing the sheet which comprises a roller conveyor for carrying the sheet in the direction of its length from the said producing means, a chamber in which the conveyor terminates, a turn-table in the chamber whereby the sheet is turned on its axis of movement, a plurality of leers extending parallelly of the said conveyor, means for transferring the sheet to one of the leers, and rollers in each of the leers whereby the sheet is carried in the direction of its width.

3. In combination with means for producing a glass sheet, apparatus for annealing the sheet which comprises a roller conveyor for carrying the sheet in the direction of its length from the said producing means, a chamber in which the conveyor terminates, a turn-table in the chamber whereby the sheet is turned on its axis of movement, the surface of the turn-table being composed of rollers, an annealing leer extending parallelly of the said conveyor and being provided with rollers, the rollers of the conveyor being at a lower level than the rollers of the turn-table, vertically movable means whereby the sheet may be transferred from the turn-table and lowered upon the rollers of the leer, the combined movements being such that the sheet is carried through the leer in the direction of its width.

LAMBERT von REIS.